United States Patent
Moore

(10) Patent No.: US 10,103,997 B2
(45) Date of Patent: Oct. 16, 2018

(54) DYNAMIC QUALITY OF SERVICE FOR OVER-THE-TOP CONTENT

(71) Applicant: AT&T Intellectual Property I, L.P., Atlanta, GA (US)

(72) Inventor: Adrian Moore, Irving, TX (US)

(73) Assignee: AT&T Intellectual Property I, L.P., Atlanta, GA (US)

(*) Notice: Subject to any disclaimer, the term of this patent is extended or adjusted under 35 U.S.C. 154(b) by 161 days.

(21) Appl. No.: 15/170,620

(22) Filed: Jun. 1, 2016

(65) Prior Publication Data
US 2017/0353389 A1     Dec. 7, 2017

(51) Int. Cl.
| | |
|---|---|
| *H04L 12/851* | (2013.01) |
| *H04L 12/26* | (2006.01) |
| *H04L 12/24* | (2006.01) |
| *H04L 12/833* | (2013.01) |
| *H04L 12/927* | (2013.01) |

(52) U.S. Cl.
CPC ........ *H04L 47/2433* (2013.01); *H04L 41/509* (2013.01); *H04L 43/08* (2013.01); *H04L 47/2458* (2013.01); *H04L 47/31* (2013.01); *H04L 47/805* (2013.01)

(58) Field of Classification Search
CPC . H04L 47/2433; H04L 47/2458; H04L 47/31; H04L 47/805; H04L 41/509; H04L 43/08
See application file for complete search history.

(56) References Cited

U.S. PATENT DOCUMENTS

| | | |
|---|---|---|
| 6,449,251 B1 | 9/2002 | Awadallah et al. |
| 6,944,169 B1 | 9/2005 | Yoshizawa et al. |
| 7,966,648 B2 | 6/2011 | Park et al. |
| 8,005,087 B2 | 8/2011 | Dolganow et al. |
| 8,732,326 B2 | 5/2014 | Su et al. |
| 8,737,217 B2 | 5/2014 | Xiong et al. |
| 9,065,779 B2 | 6/2015 | Stanwood et al. |
| 9,083,637 B2 | 7/2015 | Cheng |
| 9,225,762 B2 | 12/2015 | Mack et al. |
| 9,237,112 B2 | 1/2016 | Stanwood et al. |
| 9,722,929 B2 * | 8/2017 | Miklos ................ H04L 47/24 |
| 2008/0101405 A1 | 5/2008 | Wirick et al. |
| 2013/0179590 A1 | 7/2013 | Mccarthy et al. |

(Continued)

FOREIGN PATENT DOCUMENTS

| | | |
|---|---|---|
| CA | 2883262 A1 | 5/2014 |
| EP | 2525550 A1 | 11/2012 |

(Continued)

*Primary Examiner* — Ian N Moore
*Assistant Examiner* — Ronald H Davis

(57) ABSTRACT

A method, non-transitory computer readable medium and apparatus for changing a quality of service for data packets that are delivered over-the-top are disclosed. For example, the method includes a processor that identifies the data packets as video data packets that are delivered over-the-top in a communication network, changes the quality of service associated with the data packets from a best effort quality of service level to a higher priority quality of service level, monitors the data packets until no video data packet is identified in the data packets and changes the quality of service associated with the data packets back to the best effort quality of service level from the higher priority quality of service level.

20 Claims, 3 Drawing Sheets

(56) References Cited

U.S. PATENT DOCUMENTS

| | | | |
|---|---|---|---|
| 2014/0286438 A1* | 9/2014 | Apte | H04N 21/2343 |
| | | | 375/240.26 |
| 2014/0366070 A1 | 12/2014 | Lee et al. | |
| 2015/0026749 A1 | 1/2015 | Bringuier et al. | |
| 2015/0029854 A1* | 1/2015 | Starsinic | H04L 47/2441 |
| | | | 370/235 |
| 2015/0189552 A1* | 7/2015 | Cazanas | H04W 28/18 |
| | | | 709/227 |
| 2016/0044125 A1 | 2/2016 | Hardin et al. | |
| 2016/0073413 A1 | 3/2016 | Abrahams et al. | |

FOREIGN PATENT DOCUMENTS

| | | |
|---|---|---|
| EP | 2842379 A1 | 3/2015 |
| EP | 3024176 | 5/2016 |
| IN | 201400053 | 7/2015 |
| WO | WO 2011068784 A1 | 6/2011 |
| WO | WO 2014209494 A1 | 12/2014 |

\* cited by examiner

DYNAMIC QUALITY OF SERVICE FOR OVER-THE-TOP CONTENT

The present disclosure relates to the delivery of over-the-top content in a communication network and more particularly, to dynamically adjust a quality of service for the over-the-top content.

BACKGROUND

Over-the-top (OTT) content can be delivered in layer 2 or layer 3 of an Internet Protocol infrastructure. The data packets associated with the OTT are typically treated as general Internet traffic and given a "best effort" quality of service.

Some OTT content may be associated with video packets sent by a third party video service provider. However, when video packets sent as OTT content are treated on a "best effort" basis, the transmission of the video packets may be "bursty" when the internet traffic becomes congested or a high volume of higher priority data traffic is transmitted. As a result, the video quality may suffer. For example, the video may be degraded or pixelated, which leads to an unsatisfactory experience for the user.

Current solutions to this issue include adjustments made by the third party service provider applications, such as buffering or decreasing the quality of video based on the transmission quality. Other solutions, include the user manually adjusting the configuration of a local router at the location of the user. However, manually adjusting the configuration of the local router requires the user to know specific information associated with the video packets (e.g., the source IP address, packet identifiers, and the like). In addition, the configuration change is static.

SUMMARY

In one example, the present disclosure discloses a method, non-transitory computer readable medium and apparatus for changing a quality of service for data packets that are delivered over-the-top. For example, the method may include a processor that identifies the data packets as video data packets that are delivered over-the-top in a communication network, changes the quality of service associated with the data packets from a best effort quality of service level to a higher priority quality of service level, monitors the data packets until no video data packet is identified in the data packets and changes the quality of service associated with the data packets back to the best effort quality of service level from the higher priority quality of service level.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method for dynamically changing a quality of service for a data packet that is delivered over-the-top. As discussed above, some OTT content may be associated with video packets sent by a third party video service provider. However, when video packets sent as OTT content are treated on a "best effort" basis, the transmission of the video packets may be "bursty" when the Internet traffic becomes congested or a high volume of higher priority data traffic is transmitted. As a result, the video quality may suffer. For example, the video may be degraded or pixelated, which leads to an unsatisfactory experience for the user.

Current solutions to this issue include adjustments made by the third party service provider applications, such as buffering or decreasing the quality of video based on the transmission quality. Other solutions, include the user manually adjusting the configuration of a local router at the location of the user. However, manually adjusting the configuration of the local router requires the user to know specific information associated with the video packets (e.g., the source IP address, packet identifiers, and the like). In addition, the configuration change is static.

One embodiment of the present disclosure provides a method for dynamically, and automatically, changing a quality of service for a data packet that is delivered over-the-top. For example, certain types of data packets, such as video data packets, may be identified and the quality of service for the identified types of data packets may be increased over a default "best effort" quality of service level. The quality of service may be changed automatically by a centrally located application server or software defined network (SDN) orchestrator server. For example, the network elements that handle the transmission of the data packets from the central office to the user's endpoint device may be automatically configured to apply the higher level of quality of service without user intervention. In addition, the quality of service may be dynamically changed between the default quality of service level and the higher quality of service level as the particular type of data packets are detected, or not detected.

Figure 1:
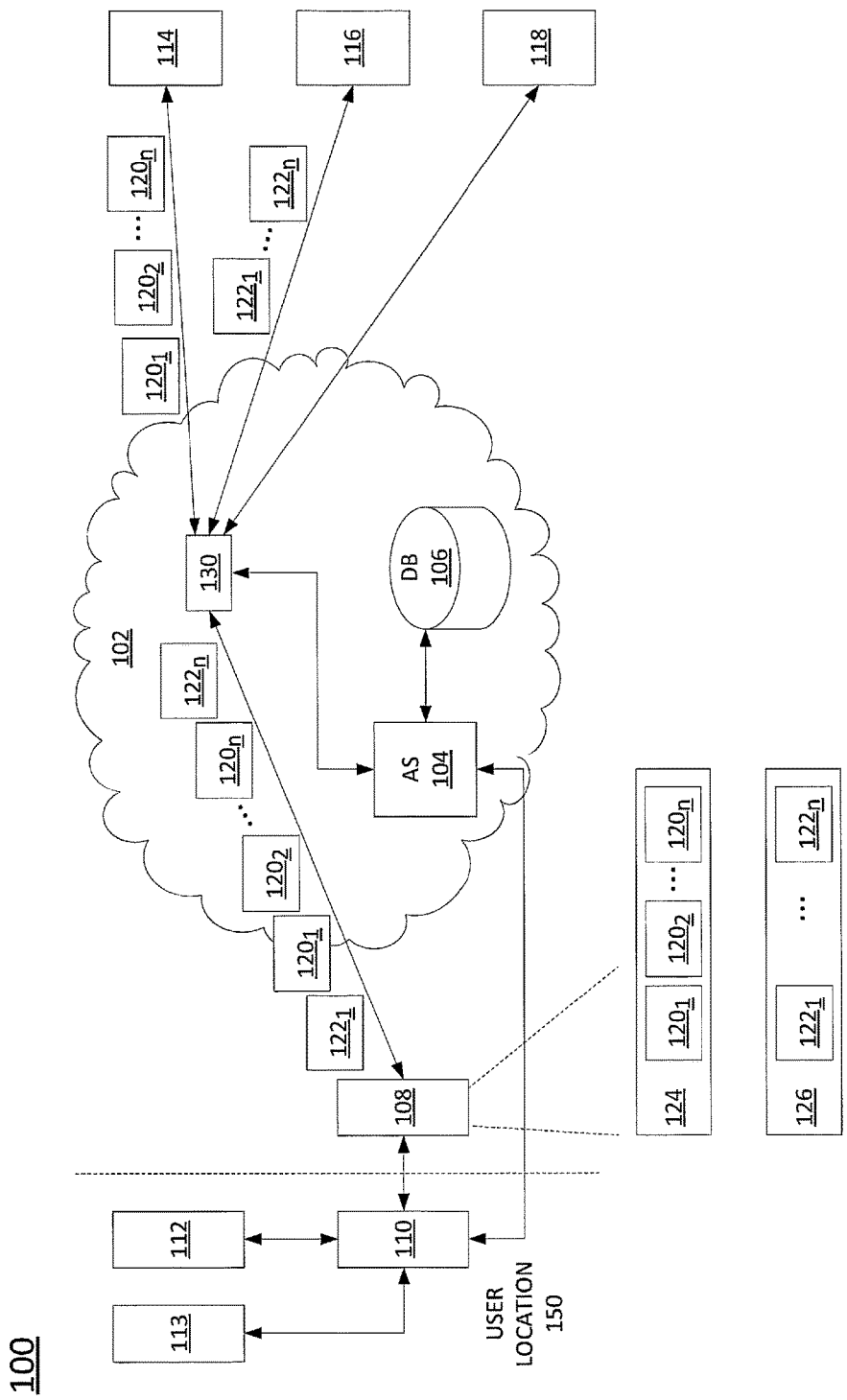
FIG. 1 illustrates an example communications network related to the present disclosure.

To aid in understanding the present disclosure, FIG. 1 illustrates an example communication network 100. In one embodiment, the communication network 100 may include an Internet Protocol (IP) network 102. The IP network 102 may be a central office operated by a communication network service provider. The communication network service provider may provide television, telephone and data services, e.g., Internet access services to subscribers. The communication network service provider may prioritize voice and television services over Internet data packets that are delivered "over-the-top" (OTT). In one embodiment, OTT may be defined as data packets that are transmitted over layer 2 or layer 3 of a seven layer open systems interconnection (OSI) model.

In one embodiment, the IP network 102 may include a network element 130, an application server (AS) 104 and a database (DB) 106. In one embodiment, the AS 104 may be a dedicated machine having a processor and memory for performing the functions described herein. In one embodiment, the AS 104 may be an SDN orchestrator server that is in communication with a network element 110 at a user location 150. The AS 104 may also be in communication with the network element 130.

In one embodiment, the DB 106 may store various information. For example, the DB 106 may store subscriber information, default quality of service levels and settings, configuration information of the network elements in the IP network 102, and the like.

In one embodiment, the network element 130 may be a central office switch. For example, the central office switch may be a central control switch that communicates with a plurality of other switches that are deployed in various access networks that branch out to other regions and subscribers. The network element 130 may be a 7450 switch, in one example.

It should be noted that the IP network 102 has been simplified for ease of explanation. For example, the IP network 102 may include other access networks and/or other network elements that are not shown, such as gateways, firewalls, border elements, network controllers, and the like.

In one embodiment, the communication network 100 may also include one or more third party video streaming service providers 114 (e.g., Netflix®, Hulu®, Amazon Instant Video®, and the like) and other third party data servers or website hosts 116 and 118. In one embodiment, the third party video streaming service provider 114 may provide video data packets $120_1$ to $120_n$ (herein also referred to individual as a video data packet 120 or collectively as video data packets 120). The third party data servers or website hosts 116 and 118 may transmit non-video data packets $122_1$ to $122_n$ (herein also referred to individually as non-video data packet 122 or collectively as non-video data packets 122).

In one embodiment, the communication network 100 may include a network element 108 that is at a demarcation line between the IP network 102 and the user location 150. The user location 150 may include a residential gateway 110 that is in communication with a user endpoint device 112, a user endpoint device 113 and the network element 108.

In one embodiment, the network element 108 may be a switch. The switch may be a 7330 switch, for example. The user endpoint devices 112 and 113 may be any type of endpoint device, such as a desktop computer, a lap top computer, a tablet computer, a smart phone, a set top box and the like.

In one embodiment, the user endpoint devices 112 and 113 may execute applications that request video data packets 120 and non-video data packets 122 from the third party service providers 114 and 116, respectively. For example, the user endpoint device 112 may be executing an application based video streaming service that is provided by the third party video streaming service provider 114. The user endpoint device 113 may be playing an online game that is provided by the third party service provider 116.

Traditionally, both types of data packets 120 and 122 would be delivered OTT via the IP network 102 on a best effort quality of service level. As a result, when a limited amount of bandwidth is available, the data packets 120 and 122 may be delivered in a "bursty" fashion. This may cause the video quality associated with the video data packets 120 to be degraded resulting in a choppy or pixelated video image.

In one embodiment of the present disclosure, certain types of data packets that are delivered OTT may be identified and a higher level of quality of service may be applied to the certain types of data packets. For example, to ensure that the video quality of streaming videos is not degraded, the present disclosure may identify video data packets that are delivered OTT and apply a higher quality of service level than the default best effort quality of service level.

For example, certain type of data packets, such as video data packets, may be identified by the residential gateway 110, the network element 108 or the network element 130. In one embodiment, the type of data packet may be identified by examining each data packet 120 and 122. For example, a deep packet inspection method may be used, the packet header of each data packet 120 and 122 may be read, and the like.

In another embodiment, a table of source IP addresses associated with third party video streaming service providers 114 may be stored in the DB 106. The source IP address of each data packet may be identified and compared to the table to determine if a match is found. If a match is found, then the data packet may be identified as a video data packet 120.

In another embodiment, the residential gateway 110 may detect when a user has requested video data packets 120 from the third party video streaming service provider 114. For example, when the user endpoint device 112 opens a video streaming application, the application may connect to a server of the third party video streaming service provider 114 that can be detected by the residential gateway 110 that routes the request. The residential gateway 110 may then send a notification to the AS 104 to notify the AS 104 that video data packets are about to arrive from the third party video streaming service provider 114.

Once the video data packets 120 are identified, the AS 104 may automatically change the quality of service level on one or more of the network element 108, the network element 130 and/or the residential gateway 110. For example, the AS 104 may automatically configure the network element 108, the network element 130 and/or the residential gateway 110 to apply a higher level of quality of service for the video data packets 120. For example, a high quality of service level queue 124 and a best effort quality of service level queue 126 may be established in the network element 108, the network element 130 and/or the residential gateway 110. It should be noted that although the high quality of service level queue 124 and the best effort quality of service level queue 126 are illustrated in the network element 108 in FIG. 1, the queues 124 and 126 may be located in any or all of the network element 108, the network element 130 and/or the residential gateway 110.

Before the present disclosure all data packets 120 and 122 that are delivered OTT would be placed in the best effort quality of service level queue 126. However, with the present disclosure, video data packets 120 that are delivered OTT may be moved to the high quality of service level queue 124. As a result, a higher quality of service level may be applied to the video data packets 120 than the best effort quality of service level that was previously applied to the video data packets 120. In other words, the present disclosure provides a way to apply different quality of service levels to different types of data packets that are delivered OTT (e.g., in layer 2 or layer 3 of an OSI model).

In one embodiment, the quality of service level may be changed dynamically without user intervention. In other words, once the video data packets 120 are no longer detected, the AS 104 may automatically re-configure each network element from a central office to the user endpoint device 112 or 113. For example, the network element 108, the network element 130 and/or the residential gateway 110 may be reconfigured to apply the best effort quality of service level to all data packets that are delivered OTT to the user endpoint device 112 or 113. As a result, the quality of service level may be automatically and dynamically configured without user intervention.

In one embodiment, a threshold time may be used to determine that the video data packets 120 are no longer detected. For example, if the data packets 120 and 122 are examined and no video data packet 120 is identified for a threshold period of time, e.g., 5 minutes, then the AS 104 may change the quality of service level to a default, or the best effort quality of service level for all data packets delivered OTT. In another embodiment, the residential gateway 110 may detect that the video streaming application has been closed on the user endpoint device 112 and send a notification, a message, or a signal, to the AS 104 to indicate that video data packets 120 will no longer be arriving for the subscriber.

In one embodiment, the quality of service level may be changed gradually over time. For example, the user may be "surfing" different video streaming options available on the video streaming application running on the user endpoint device 112. As a result, immediately increasing and decreasing the quality of service levels for video data packets 120 may be taxing on the network element 108, the network element 130, the residential gateway 110 and/or the AS 104.

To prevent taxing the network element 108, the network element 130, the residential gateway 110 and/or the AS 104, the quality of service level may be increased gradually over different time periods. For example, if the user has subscribed to 10 gigabytes (GB) of bandwidth, when a first video data packet $120_1$ is identified, the quality of service level may be changed to provide a dedicated 4 GB of bandwidth for the video data packets 120 over a default level best effort (e.g., 0 GB, 1 GB, or a variable amount depending on an amount of higher priority data packets that are arriving). After 5 minutes, if more video data packets 120 are detected, then 6 GB of bandwidth may be dedicated to the video data packets 120. After 10 minutes, if more video data packets 120 are detected, then 8 GB of bandwidth (e.g., a full amount of bandwidth associated with the higher quality of service level) may be dedicated to the video data packets 120.

In one embodiment, the user may provide user feedback to the AS 104. For example, in certain instances, the user may not want the higher quality of service level applied to the video data packets 120. For example, the user may want no degradation from the online game associated with the non-video data packets 122. As a result, the user may send a request to the AS 104 to remove the higher quality of service level that has been applied to the video data packets 120.

In one embodiment, the AS 104 may send a notification to all user endpoint devices or one or more user endpoint devices (e.g., the user endpoint device 113 and 112) at the user location 150 when the higher quality of service level is applied. The notification may include an option to accept or reject the quality of service change.

In another embodiment, the user may request the higher quality of service level that is applied to be removed at any time. For example, the user may be watching a streaming video on the user endpoint device 112 and the higher quality of service level may be applied to the video data packets 120. However, during the streaming video, another user at the user location may complain that the online game is lagging on the user endpoint device 113 due to the change in the quality of service that is applied to the video data packets 120 (e.g., video data packets 120 are given a higher quality of service level over the non-video data packets 122). As a result, the user may send a request to the AS 104 to change the quality of service level back to a default best effort quality of service level despite the video data packets 120 being identified and the quality of service level for the video data packets 120 may be changed back to the default best effort quality of service level.

Figure 2:
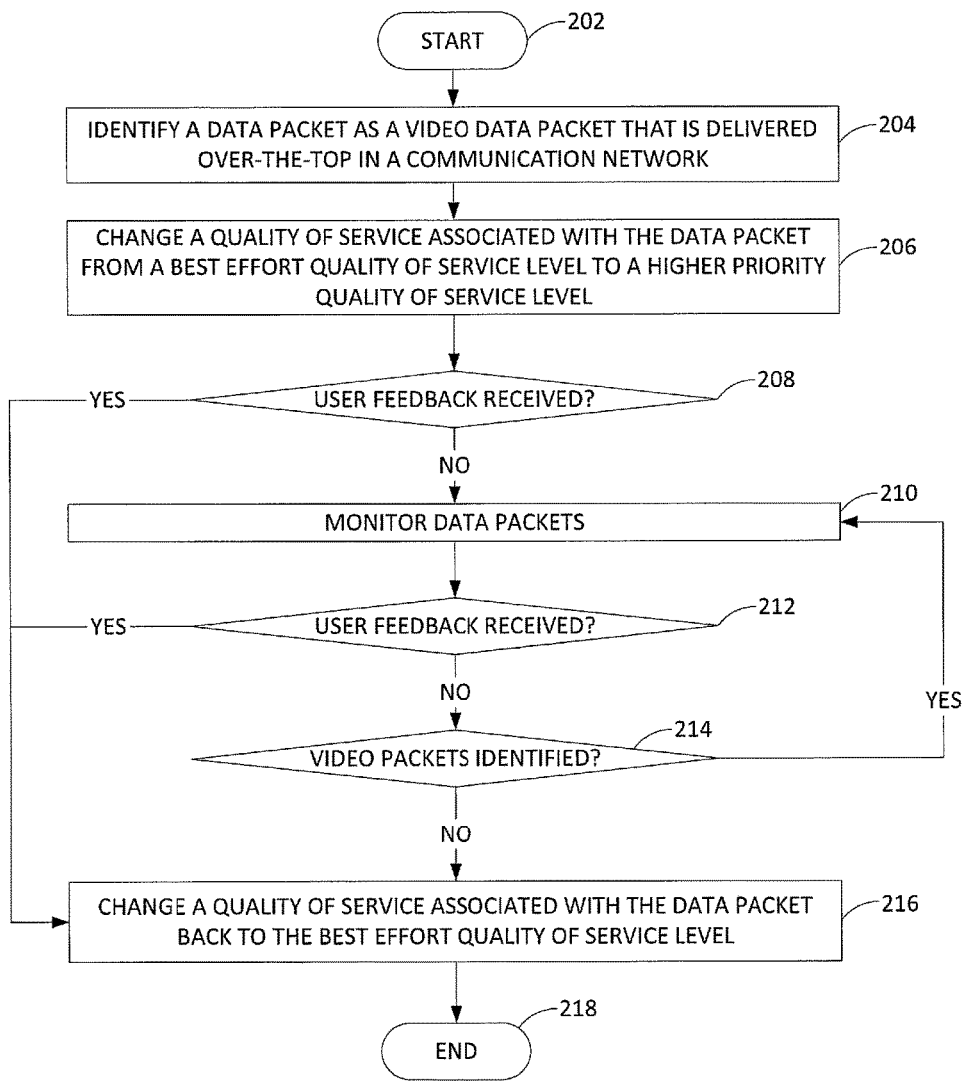
FIG. 2 illustrates a flowchart of an example method for changing a quality of service for a data packet that is delivered over-the-top.

FIG. 2 illustrates a flowchart of an example method 200 for changing a quality of service for a data packet that is delivered over-the-top in accordance with the present disclosure. In one embodiment, steps, functions, and/or operations of the method 200 may be performed by the AS 102 or the residential gateway 110 illustrated in FIG. 1 and described above. In one embodiment, the steps, functions, or operations of method 200 may be performed by a computing device or system 300, and/or processor 302 as described in connection with FIG. 3 below. For illustrative purpose, the example method 200 is described in greater detail below in connection with an embodiment performed by a processor, such as processor 302.

The method 200 begins in step 202. At step 204, a processor identifies a data packet (e.g., a packet from a flow of a plurality of data packets) as a video data packet that is delivered over-the-top in a communication network. As discussed above, the video data packet may be identified by examining each data packet. For example, a deep packet inspection method may be used. In one example, the header of each data packet of a flow of a plurality of data packets may contain information relating to a type of data packet.

In another embodiment, a table of source IP addresses associated with third party video streaming service providers may be generated and stored. The source IP address of the data packet may be compared to the source IP addresses stored in the table. If a match exists, then the data packet may be identified as a video data packet.

In another embodiment, the residential gateway may detect that a video streaming application has been opened on a user endpoint device. The residential gateway may then notify an AS or SDN orchestrator at a central office of the Internet service provider that video data packets will be arriving.

At step 206, the processor changes a quality of service associated with the data packet from a best effort quality of service level to a higher priority quality of service level. In one embodiment, the quality of service level may be changed by assigning the video data packets to a higher quality of service level queue instead of a best effort quality of service level queue. In another embodiment, the quality of service level may be changed by increasing an amount of dedicated bandwidth that is assigned to the video data packets as compared to non-video data packets.

In one embodiment, the quality of service level may be changed gradually over time. For example, the user may be "surfing" different videos on the video streaming application that causes gaps between the video data packets. As a result, to prevent taxing the network elements, the residential gateway, and/or the AS, the quality of service level may be gradually increased to ensure that the user has selected a video and has stopped "surfing."

At optional step 208, the processor determines whether user feedback is received. For example, when the quality of service level is initially changed, a notification message may be sent to the user endpoint device notifying the user of the change. The notification message may include an option to accept or decline the change of quality of service so that the quality of service may be immediately returned to the best effort quality of service level if the user declines the change.

If no user feedback is received, the method 200 proceeds to step 210. If user feedback is received, the method 200 may proceed to step 216.

At step 210, the processor continues to monitor the data packets. For example, the processor continues to monitor the flow of data packets to determine that video data packets are still being transmitted OTT.

At optional step 212, the processor may determine whether user feedback is received. As noted above, the user may provide user feedback at the time that the change of quality of service level is applied (e.g., in step 206) or any time after the change of quality of service level is applied (e.g., after the user has begun watching a streaming video, as described above). If no user feedback is received, the method 200 may proceed to step 214. If user feedback is received, the method 200 may proceed to step 216.

At step 214, the processor determines whether video data packets are still being identified. In one embodiment, a time threshold may be used. For example, if video data packets are not identified within a 10 minute time period, the method 200 may proceed to step 216. However, if a video data packet is identified within the 10 minute time period, the method 200 may continue to loop back to step 210 to continue the monitoring of additional data packets. In one embodiment, the time threshold may be reset each time a video data packet is detected.

At step 216, the processor changes the quality of service associated with the data packet back to the best effort quality of service level. For example, either the user provided user feedback to revert the quality of service level back to the best effort quality of service level or the video data packets are no longer identified. At step 218, the method 200 ends.

It should be noted that although not specifically specified, one or more steps, functions or operations of the method 200 may include a storing, displaying and/or outputting step as required for a particular application. In other words, any data, records, fields, and/or intermediate results discussed in the respective methods can be stored, displayed and/or outputted to another device as required for a particular application. Furthermore, steps, blocks or operations in FIG. 2 that recite a determining operation or involve a decision do not necessarily require that both branches of the determining operation be practiced. In other words, one of the branches of the determining operation can be deemed as an optional step. In addition, one or more steps, blocks, functions or operations of the above described method 200 may comprise optional steps, or can be combined, separated, and/or performed in a different order from that described above, without departing from the example embodiments of the present disclosure. Furthermore, the use of the term "optional" in the above disclosure does not mean that any other steps not labeled as "optional" are not optional. As such, any claims not reciting a step that is not labeled as optional is not to be deemed as missing an essential step, but instead should be deemed as reciting an embodiment where such omitted steps are deemed to be optional in that embodiment.

Figure 3:
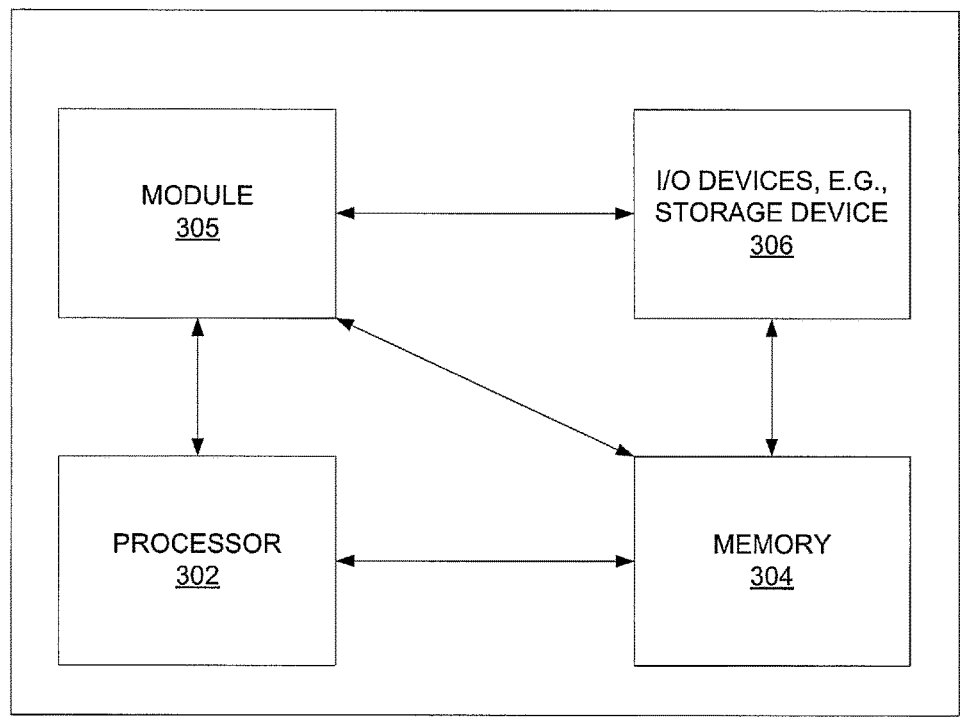
FIG. 3 illustrates a high-level block diagram of a computer suitable for use in performing the functions described herein.

FIG. 3 depicts a high-level block diagram of a computing device suitable for use in performing the functions described herein. As depicted in FIG. 3, the system 300 comprises one or more hardware processor elements 302 (e.g., a central processing unit (CPU), a microprocessor, or a multi-core processor), a memory 304 (e.g., random access memory (RAM) and/or read only memory (ROM)), a module 305 for changing a quality of service for a data packet that is delivered over-the-top, and various input/output devices 306 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computing device may employ a plurality of processor elements. Furthermore, although only one computing device is shown in the figure, if the method 200, as discussed above, is implemented in a distributed or parallel manner for a particular illustrative example, i.e., the steps of the above method 200, or the entirety of method 200 is implemented across multiple or parallel computing device, then the computing device of this figure is intended to represent each of those multiple computing devices.

Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable gate array (PGA) including a Field PGA, or a state machine deployed on a hardware device, a computing device or any other hardware equivalents, e.g., computer readable instructions pertaining to the method discussed above can be used to configure a hardware processor to perform the steps, functions and/or operations of the above disclosed method 200. In one embodiment, instructions and data for the present module or process 305 for changing a quality of service for a data packet that is delivered over-the-top (e.g., a software program comprising computer-executable instructions) can be loaded into memory 304 and executed by hardware processor element 302 to implement the steps, functions or operations as discussed above in connection with the illustrative method 200. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method can be perceived as a programmed processor or a specialized processor. As such, the present module 305 for monitoring an operation cycle of an appliance (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. Furthermore, a "tangible" computer-readable storage device or medium comprises a physical device, a hardware device, or a device that is discernible by the touch. More specifically, the computer-readable storage device may comprise any physical devices that provide the ability to store information such as data and/or instructions to be accessed by a processor or a computing device such as a computer or an application server.

While various embodiments have been described above, it should be understood that they have been presented by way of example only, and not a limitation. Thus, the breadth and scope of a preferred embodiment should not be limited by any of the above-described exemplary embodiments, but should be defined only in accordance with the following claims and their equivalents.

What is claimed is:

1. A method for changing a quality of service for data packets comprising video data packets and non-video data packets having a best effort quality of service level that are delivered over-the-top, the method comprising:
    identifying, by a processor, at least one data packet of a video stream in the data packets as a video data packet that is delivered over-the-top in a communication network;
    changing, by the processor, the quality of service associated with the at least one data packet from the best effort quality of service level to a higher priority quality of service level;
    monitoring, by the processor, the data packets until at least one non-video data packet is identified in the data packets;
    maintaining, by the processor, the quality of service associated with the at least one non-video data packet at the best effort quality of service level;
    identifying, by the processor, at least another data packet of the video stream in the data packets as another video data packet that is delivered over-the-top in the communication network; and
    changing, by the processor, the quality of service associated with the at least another data packet from the best effort quality of service level to the higher priority quality of service level.

2. The method of claim 1, wherein the identifying the at least one data packet is based on an examination of a header information that indicates that the at least one data packet as the video data packet.

3. The method of claim 1, wherein the identifying the at least one data packet is based on a detection of a video streaming application being activated at an endpoint device of a user.

4. The method of claim 1, wherein the identifying the at least one data packet is based on a table of internet protocol addresses associated with third party video streaming service providers and comparing a source internet protocol address of each data packet of the data packets to the internet protocol addresses in the table.

5. The method of claim 1, wherein the changing the quality of service associated with the at least one data packet to the higher priority quality of service level comprises increasing an amount of bandwidth allocated to the at least one data packet.

6. The method of claim 1, wherein the changing the quality of service associated with the at least one data packet to the higher priority quality of service level comprises assigning the at least one data packet to a high quality of service level queue instead of a best effort quality of service level queue.

7. The method of claim 1, further comprising:
    receiving, by the processor, a user feedback to reject the changing of the quality of service associated with the at least one data packet to the higher priority quality of service level.

8. The method of claim 1, wherein the changing the quality of service associated with the at least one data packet to the higher priority quality of service level comprises changing, by the processor, a configuration of each network element from a central office to the endpoint device of the user to apply the higher priority quality of service level.

9. A non-transitory computer-readable storage device storing a plurality of instructions which, when executed by a processor, cause the processor to perform operations for changing a quality of service for data packets comprising video data packets and non-video data packets having a best effort quality of service level that are delivered over-the-top, the operations comprising:
    identifying at least one data packet of a video stream in the data packets as a video data packet that is delivered over-the-top in a communication network;
    changing the quality of service associated with the at least one data packet from the best effort quality of service level to a higher priority quality of service level;
    monitoring the data packets until at least one non-video data packet is identified in the data packets;
    maintaining the quality of service associated with the at least one non-video data packet at the best effort quality of service level;
    identifying at least another data packet of the video stream in the data packets as another video data packet that is delivered over-the-top in the communication network; and
    changing the quality of service associated with the at least another data packet from the best effort quality of service level to the higher priority quality of service level.

10. The non-transitory computer-readable storage device of claim 9, wherein the identifying the at least one data packet is based on an examination of a header information that indicates that the at least one data packet as the video data packet.

11. The non-transitory computer-readable storage device of claim 9, wherein the identifying the at least one data packet is based on a detection of a video streaming application being activated at an endpoint device of a user.

12. The non-transitory computer-readable storage device of claim 9, wherein the identifying the at least one data packet is based on a table of internet protocol addresses associated with third party video streaming service providers and comparing a source internet protocol address of each data packet of the data packets to the internet protocol addresses in the table.

13. The non-transitory computer-readable storage device of claim 9, wherein the changing the quality of service associated with the at least one data packet to the higher priority quality of service level comprises increasing an amount of bandwidth allocated to the at least one data packet.

14. The non-transitory computer-readable storage device of claim 9, wherein the changing the quality of service associated with the at least one data packet to the higher priority quality of service level comprises assigning the at least one data packet to a high quality of service level queue instead of a best effort quality of service level queue.

15. The non-transitory computer-readable storage device of claim 9, further comprising:
    receiving a user feedback to reject the changing of the quality of service associated with the at least one data packet to the higher priority quality of service level.

16. The non-transitory computer-readable storage device of claim 9, wherein the changing the quality of service associated with the at least one data packet to the higher priority quality of service level comprises changing, by the processor, a configuration of each network element from a central office to the endpoint device of the user to apply the higher priority quality of service level.

17. An apparatus for changing a quality of service for data packets comprising video data packets and non-video data packets having a best effort quality of service level that are delivered over-the-top, comprising:

a processor; and a computer-readable medium storing instructions which, when executed by the processor, cause the processor to perform operations, the operations comprising:

identifying at least one data packet of a video stream in the data packets as a video data packet that is delivered over-the-top in a communication network;

changing the quality of service associated with the at least one data packet from the best effort quality of service level to a higher priority quality of service level;

monitoring the data packets until at least one non-video data packet is identified in the data packets;

maintaining the quality of service associated with the at least one non-video data packet at the best effort quality of service level;

identifying at least another data packet of the video stream in the data packets as another video data packet that is delivered over-the-top in the communication network; and changing the quality of service associated with the at least another data packet from the best effort quality of service level to the higher priority quality of service level.

18. The apparatus of claim 17, wherein the identifying the at least one data packet is based on an examination of a header information that indicates that the at least one data packet as the video data packet.

19. The apparatus of claim 17, wherein the identifying the at least one data packet is based on a detection of a video streaming application being activated at an endpoint device of a user.

20. The apparatus of claim 17, wherein the identifying the at least one data packet is based on a table of internet protocol addresses associated with third party video streaming service providers and comparing a source internet protocol address of each data packet of the data packets to the internet protocol addresses in the table.

* * * * *